Sept. 30, 1969
S. M. MacNEILLE
3,470,491
BISTABLE LASER APPARATUS
Filed March 31, 1964
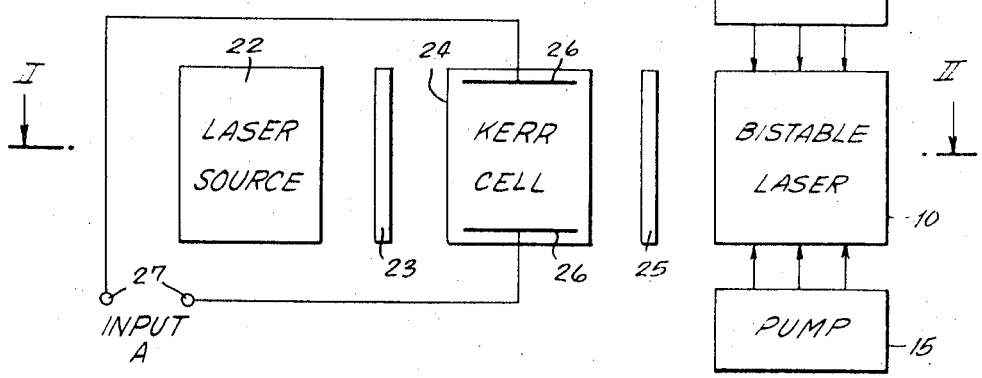
Fig. 1.
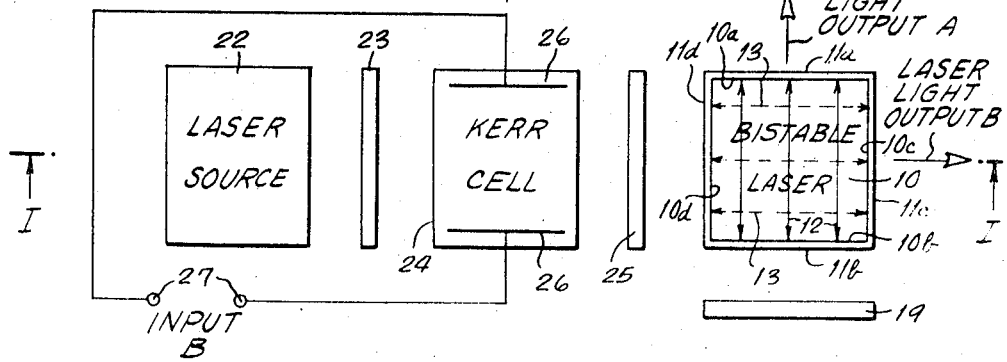
Fig. 2.
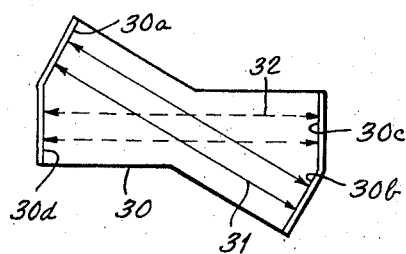
Fig. 3.
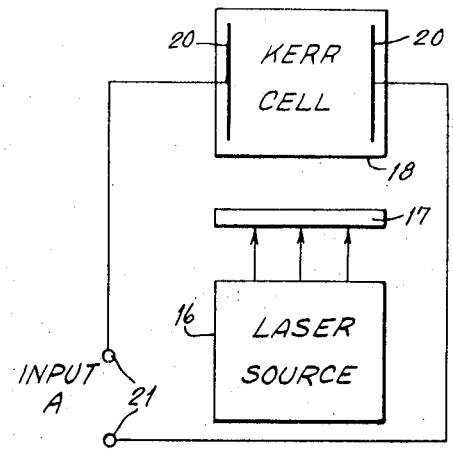
INVENTOR.
STEPHEN M. MacNEILLE
BY Lester W. Clark
ATTORNEY

3,470,491
BISTABLE LASER APPARATUS

Stephen M. MacNeille, Thompson, Conn., assignor, by mesne assignments, to American Optical Company, Southbridge, Mass., a corporation of Delaware
Filed Mar. 31, 1964, Ser. No. 356,201
Int. Cl. H01s 3/08; H03k 3/42
U.S. Cl. 331—94.5                                8 Claims

ABSTRACT OF THE DISCLOSURE

A laser apparatus including two optical resonant cavities, each cavity having a pair of parallel reflecting surfaces, with each pair of reflecting surfaces nonparallel with respect to the other and spaced to resonate at the same frequency. Included within the reflecting surfaces is a region common to both resonant cavities with a laser element occupying a substantial portion of the common region. The device provides a laser having two distinguishable output states which switchably responds to input signals.

---

This invention relates to bistable laser apparatus useful, for example, in optical computers.

Modern digital computers commonly handle data in terms of binary quantities wherein each digit has only two possible values, namely "0" and "1." In using such binary quantities, it is convenient to use bistable devices having two stable states, one of which states indicates the binary quantity "0" and the other the binary quantity "1." Such bistable devices are used in computers for storage of data, for performing logic functions such as computations, and for other functions.

In recent years it has been proposed to build optical computers, which potentially can operate at a higher speed than electronic computers because of the higher frequencies employed in the optical range of electromagnetic energy. In order to handle binary data in optical computers, bistable elements are required which can produce distinctive light beam outputs to indicate the two binary quantities.

An object of the present invention is to provide a bistable laser device having two distinguishable output states and means for switching it selectively between the two stable states.

Another object is to provide a device of the type described which is switchable between the two stable states in response to electrical input signals.

Another object is to provide a device of the type described which is switchable between the two stable states in response to optical input signals.

The foregoing and other objects of the invention are attained in the embodiment of the invention described herein. In that embodiment, a bistable laser element is provided including two optical resonant cavities, defined in part by two pairs of spaced parallel reflecting surfaces, each pair being nonparallel with respect to the other pair. The two pairs of reflecting surfaces are spaced apart so that they resonate at the same frequency and are so supported that the two cavities include a common region. A laser element occupies at least a substantial portion of that common region. Means are provided for pumping the laser element with optical energy. Two input means are provided for directing into the laser element coherent light beams respectively directed perpendicular to said pairs of surfaces. When an input signal is received from one of the coherent light beams, it establishes oscillation in the laser element in the direction of that particular light beam, and quences any oscillation pre-existing in the element in the direction of the other light beam. Means are provided for taking two outputs from the laser element through at least one of each of the two pairs of parallel surfaces. The laser thus has two stable conditions, in each of which conditions it oscillates along an axis perpendicular to a particular one of the two pairs of parallel surfaces. Means are provided for selectively actuating the two coherent light beams directing means so as to switch the laser element between its two stable conditions. The two output beams of the laser element may be utilized to actuate additional computer elements, such as devices for performing logic functions.

Other objects and advantages of the invention will become apparent from a consideration of the following specification and claims, taken together with the accompanying drawing.

In the drawing:

FIG. 1 is a somewhat diagrammatic elevational view of one form of bistable laser apparatus embodying the invention, taken on the line I—I of FIG. 2;

FIG. 2 is a somewhat diagrammatic view of the bistable laser apparatus of FIG. 1 taken on the line II—II of FIG. 1; and FIG. 3 is a diagrammatic illustration of another form of laser element which may be used in placed of that shown in FIG. 2.

There is shown in FIG. 2 a bistable laser element 10 having a square cross-section, so that it has one pair of parallel surfaces 10a and 10b and a second pair of parallel surfaces 10c and 10d. The respective surfaces of the laser element 10 are provided with reflective coating 11a, 11b, 11c and 11d. If the laser element 10 is physically small, i.e., approximately ½" square, it will need to have its four surfaces 10a, 10b, 10c and 10d silvered to provide approximately 3% transmission of output laser light. If the laser element 10 has somewhat larger physical dimensions (e.g., approximately 4" square), then it may have thinner silver layer for larger percentages (e.g., 30%) of light transmission and if sufficiently large (e.g., 12" square) will laser satisfactorily with the usual 4% Fresnel reflectance of unsilvered surfaces.

The surfaces 10a and 10b constitute a first pair of spaced reflecting surfaces constituting the ends of a first optical resonant cavity having an axis extending in the direction of the solid line arrows 12 in the drawing. The surfaces 10c and 10d similarly provide a second resonant cavity having an axis extending in the direction of the dotted line arrows 13 in the drawing. Each of the two resonant cavities should resonate at the same frequency and have a sufficiently high Q to provide laser action just above the threshold value. The laser element 10 is pumped by conventional pumping light sources 14 and 15 preferably placed above and below the bistable laser element 10, as it appears in FIG. 1, and directing its pumping light perpendicular to the axes of both the two resonant cavities.

Apparatus is provided for directing into the laser element 10 a coherent light beam in a direction perpendicular to the surfaces 10a and 10b. This apparatus includes a laser source 16 of coherent light, a polarizer plate 17 for polarizing the output of the source 16 in a predetermined plane, a Kerr cell 18 in the path of the polarized light passing through the polarizer plate 17, an analyzer plate 19 having its plane of polarizing set at right angles to the plane of the polarizer plate 17 and in alignment with the axis of the resonant cavity defined by the surfaces 10a and 10b.

The Kerr cell includes a pair of plates 20, which when electrically charged are effective to rotate the light beam passing through the cell from the plane of the polarizer plate 17 to the plane of the analyzer plate 19. Thus, when the plates 20 are electrically charged, light can pass from the source 16 through the polarizer plate 17, Kerr cell 20 and analyzer plate 19 into the laser element 10 along the solid line axis 12. The plates 20 of the Kerr cell are connected to a pair of input terminals 21, so as to respond to an electrical input signal.

Apparatus is provided for directing a second coherent light beam onto the laser element 10 in a direction perpendicular to the surfaces 10c and 10d. This apparatus includes a laser source 22, a polarizer 23, a Kerr cell 24 and an analyzer plate 25, all functioning in the same general fashion as the corresponding elements 16, 17, 18, 19, just described. The Kerr cell has plates 26 connected to input terminals 27, corresponding in structure and function to the plates 20 and input terminals 21.

OPERATION

Each Kerr cell and its associated polarizer plate and analyzer plate constitutes a light valve for admitting light from one of the laser sources 16 and 22 to the bistable laser element 10. The bistable element 10 is contemplated for use with a component of a light frequency computer, so that each normal laser emissive interval about one or two milliseconds of the element 10 under conventional pulsed laser operation may be considered continuous in a computer which performs $10^9$ operational steps per second.

Assume that the Kerr cells 18 and 24 are both deenergized, i.e., no input signals at either terminals 21 or 27. Assume also that when the Kerr cells are deenergized they are effective to block transmission of light from the laser sources 16 and 22 to the laser element 10. If the laser element 10 is then illuminated by pumping light, an inversion of energy population states begins and increases to a threshold level at which the spontaneously emitted photonic light energy exceeds the sum total of energy losses in one of the two resonant cavities. When this occurs, laser action begins and its intensity increases rapidly to some plateau value limited by saturation effects. Laser action will begin in the one of the two cavities having the lower losses. It may be assumed that this occurs in the cavity represented by the dotted arrows 13. If the Kerr cell 18 is now energized by an input signal, then the polarized light transmited by the plate 17 is rotated 90° by the Kerr cell for transmission by the analyzer plate 19 to the laser element 10. This light is coherent light from the laser source 16. The intensity of that light as transmitted to the laser element 10 should be greater than that existing in the laser element 10. This impressed light from the source 16 effects a depletion of the ions available in the upper energy level set for lasering action in the cavity represented by the broken line arrows 13. This depletion of ions leaves insufficient ions available to overcome the losses in the dotted line cavity of the laser element 10, so that laser action halts in that cavity and the laser output light through the coating 11c is terminated. The laser light entering the element 10 from the source 16 now stimulates light emission by ionic transition from the upper energy level, and this light emission is in the direction of and reinforces the stimulating light and thus is in the direction of the solid line arrows 12. Light emission thereupon builds up in the direction of the solid line arrows 12 and rapidly becomes a self-sustaining laser action as soon photonic light emitting energy exceeds the total losses in the resonant cavity represented by the solid line arrows 12. This laser action continues even after the Kerr cell 18 is deenergized; thus there is now developed laser light output through the coating 11a with extinction of the laser light output through the coating 11c. A subsequent reenergization of the Kerr cell 18 makes no change in this stable state of the laser 10.

If the Kerr cell 24 is now energized to effect transmission of light from the source 22 to the laser element 10, a depletion of ion action, by the laser light source 22, establishes laser operation in the resonant cavity indicated by the dotted line arrow 13 and terminates the laser operation in the cavity represented in the solid line arrows 12. This terminates the laser light at output A and initiates laser light at output B. This newly initiated laser output continues even though Kerr cell 24 is deenergized and will not be changed by a subsequent reenergization of Kerr cell 24.

While the apparatus is illustrated in FIGS. 1 and 2 as being responsive to electrical input signals, it should be recognized that it can be readily modified to respond to optical input signals. For example, the Kerr cells and their associated polarizer and analyzer plates could be eliminated and an optical input signal could be used to trigger the pumping light supply to the laser sources 16, and 22. Alternatively, an optical input signal could be used to control the electrical inputs 21 and 27 to the Kerr cells.

FIG. 3

This figure illustrates an X shape laser element 30, which may be used in place the bistable laser element 10. It may be seen that the laser element 30 has one pair of parallel surfaces 30a and 30b and a second pair of parallel surfaces 30c, 30d. The surfaces 30a, 30b define a first optical cavity indicated by the solid lines 31. The surfaces 30c, 30d constitute the reflecting ends of a second optical cavity indicated by the dotted lines 32. Note that the two cavities intersect so that a substantial portion of the laser material within the cavities is common to both of the two cavities. This provision of a common portion in the two laserable cavities is essential to the present invention. The reflecting surfaces may be outside and spaced from the laserable material, although it is preferred to have the reflecting surfaces abutting surfaces of the laserable material.

The switching action of a bistable laser as described above is accompanied by a slight delay, occasioned by the fact that the light beam that causes the switching action must first effect an ionic depletion sufficient to quench the self-sustaining action in the previously active resonant cavity. After that depletion, the inversion of energy population states must be restored to a value exceeding the threshold level before the lasering action stimulated by the switching light beam may begin in the other resonant cavity. This resoration of the inversion population requires a brief interval.

The Kerr cells 18 and 20 illustrate one example of a practical light valve structure. These cells were chosen because they have a speed of response less than one microsecond. Other forms of light valves having speeds of response of the same order of magnitude or faster may be used.

For the purpose of minimizing the switchover delay and ensuring positive switching action, the laser element 10 is preferably operated just above the laser threshold value of population inversion states.

While I have shown and described certain preferred embodiments of my invention, other modifications thereof will readily occur to those skilled in the art, and I therefore intend my invention to be limited only by the appended claims.

I claim:

1. Bistable laser apparatus, comprising:
    (a) two optical resonant cavities defined in part by two pairs of spaced parallel reflecting surfaces, each pair being nonparallel with respect to the other pair, both pairs being spaced to resonate at the same frequency;
    (b) means supporting said pairs of reflecting surfaces so that the two cavities include a common region;
    (c) a laser element occupying at least a substantial portion of said common region;
    (d) means for pumping said laser element with optical energy;
    (e) means for directing into said laser element a coherent light beam in a direction perpendicular to one of said pair of surfaces; and
    (f) means for directing into said laser element a coherent light beam in a direction perpendicular to the other pair of surfaces.

2. Bistable laser apparatus as defined in claim 1 including means for selectively actuating said two directing means.

3. Bistable apparatus as defined in claim 1, in which each said directing means comprises:
   (a) a source of coherent light for producing an output beam directed perpendicular to one of said pairs of surfaces; and
   (b) light valve means for selectively blocking and unblocking the impingement of the beam on said one pair of surfaces.

4. Bistable laser apparatus as defined in claim 3, including means for selectively unblocking the light valve means of the two directing means.

5. Bistable laser apparatus as defined in claim 1, in which said laser element comprises a body of solid laserable material having two pairs of spaced parallel surfaces respectively extending perpendicular to the axes of said two cavities.

6. Bistable laser apparatus as defined in claim 5, in which said surfaces are coated with reflective material.

7. Bistable laser apparatus as defined in claim 1, in which the axes of the two cavities are perpendicular.

8. Bistable laser apparatus as defined in claim 1, in which the axes of the two cavities intersect at an angle other than 90°.

References Cited

UNITED STATES PATENTS

| | | | |
|---|---|---|---|
| 3,177,446 | 4/1965 | Hoadley et al. | 331—94.5 |
| 3,270,291 | 8/1966 | Kosonocky | 331—94.5 |
| 3,215,949 | 11/1965 | Garrett | 331—94.5 |

OTHER REFERENCES

Giant Optical Pulsations From Ruby, McClung & Hellwarth, September 1961, Hughes Research Laboratories.

RONALD L. WIBERT, Primary Examiner

E. BAUER, Assistant Examiner

U.S. Cl. X.R.

307—312